No. 860,850. PATENTED JULY 23, 1907.
T. R. BROWN.
TRANSPORTATION CAR AND THE LIKE.
APPLICATION FILED MAY 17, 1907.
3 SHEETS—SHEET 1.
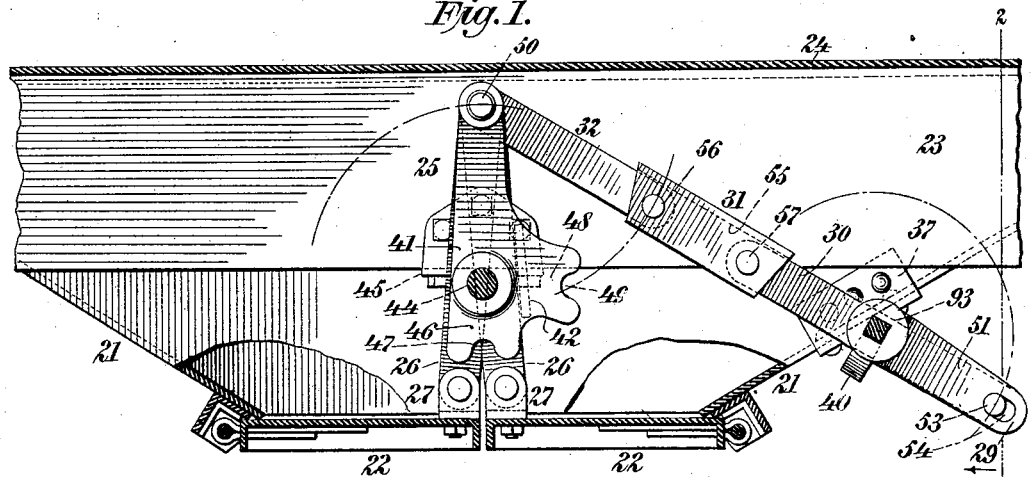
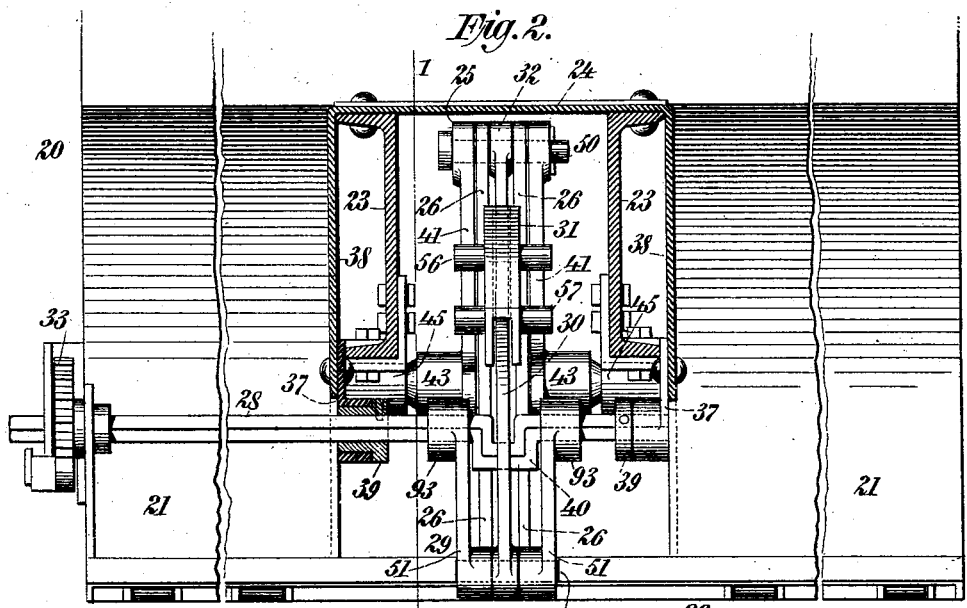
 
WITNESSES:
Gustave Dieterich
Edwin K. Dietrich
INVENTOR
Thomas R. Brown
BY Chas. C. Gill
ATTORNEY No. 860,850. PATENTED JULY 23, 1907.
T. R. BROWN.
TRANSPORTATION CAR AND THE LIKE.
APPLICATION FILED MAY 17, 1907.

3 SHEETS—SHEET 2.

WITNESSES:
Gustave Dieterich
Edwin F. Dieterich

INVENTOR
Thomas R. Brown
BY Chas. C. Gill
ATTORNEY

THE NORRIS PETERS CO., WASHINGTON, D. C.

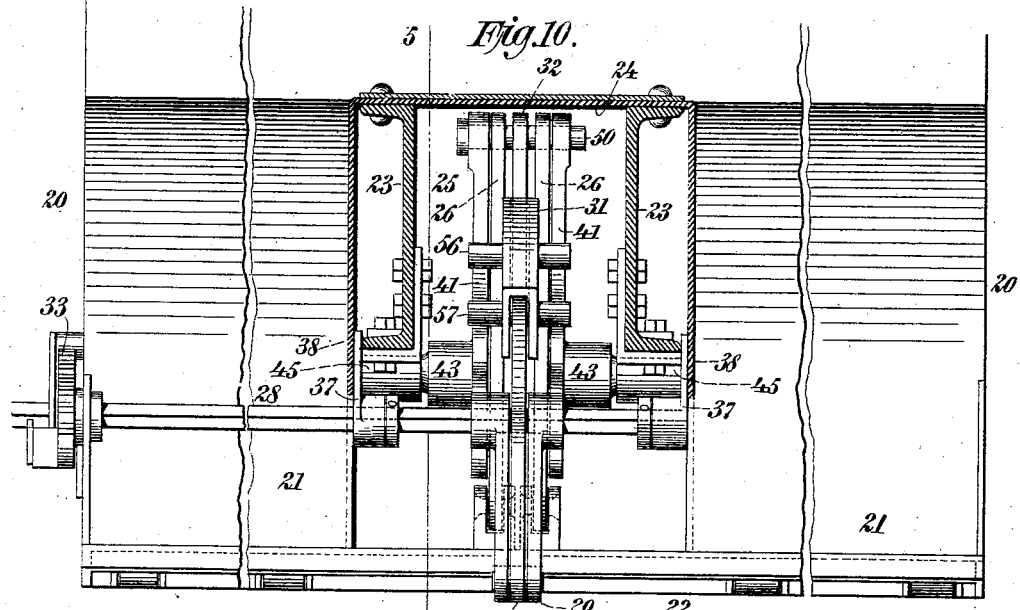
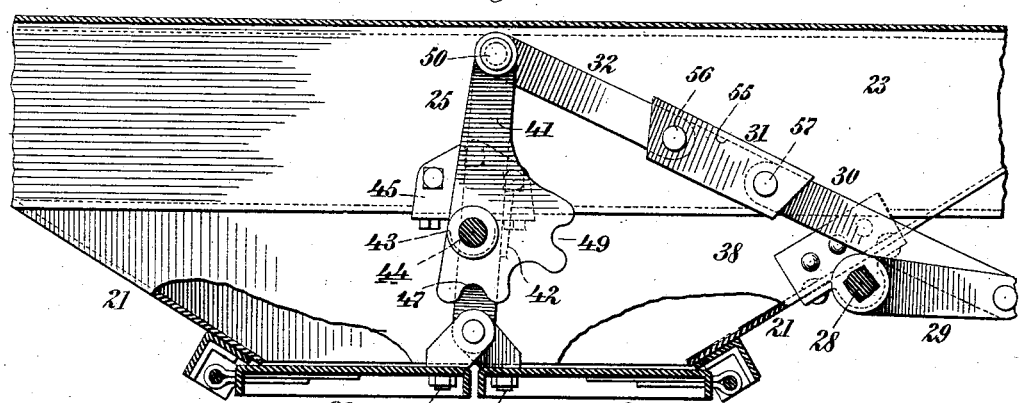
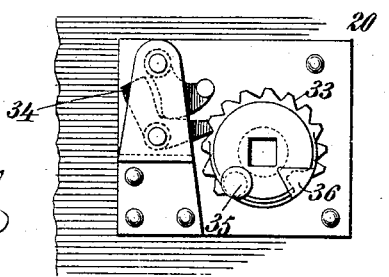

UNITED STATES PATENT OFFICE.

THOMAS R. BROWN, OF NEW YORK, N. Y., ASSIGNOR TO BENJAMIN A. HEGEMAN, JR., OF NORTH PLAINFIELD, NEW JERSEY.

TRANSPORTATION-CAR AND THE LIKE.

No. 860,850.  Specification of Letters Patent.  Patented July 23, 1907.

Application filed May 17, 1907. Serial No. 373,734.

*To all whom it may concern:*

Be it known that I, THOMAS R. BROWN, a citizen of the United States, and a resident of New York city, in the county of New York and State of New York, have invented certain new and useful Improvements in Transportation-Cars and the Like, of which the following is a specification.

The invention relates to improvements in transportation cars and the like, and it consists in the novel mechanism hereinafter described for opening, closing and locking the discharge gate or gates at the bottom of the car.

The object of the invention is to provide efficient, easily operated and durable mechanism for closing and opening the discharge gates of cars and for locking said gates in their closed position, and in carrying out my invention I provide between the center or draft sills of the car a pivotally mounted frame connected by links with the hinged gates and operate the same from a transverse shaft located at one side of the gates and below one inclined floor section of the car, this shaft having on its outer end means whereby it may be rotated in either direction and at its inner end carrying a crank arm which is connected by jointed links with the pivotally mounted frame hereinbefore referred to, and whereby motion may be communicated from the said operating shaft to the said pivotally mounted frame for opening and closing the discharge gates.

Figure 5:
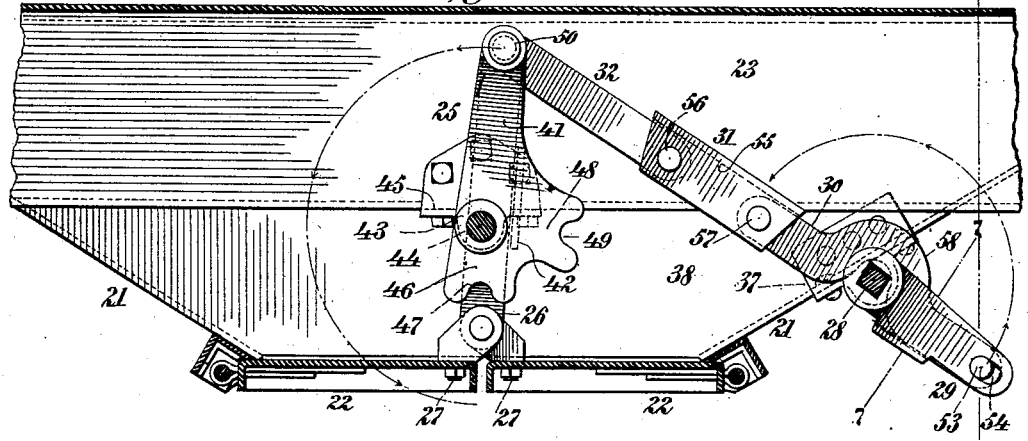
Figure 6:
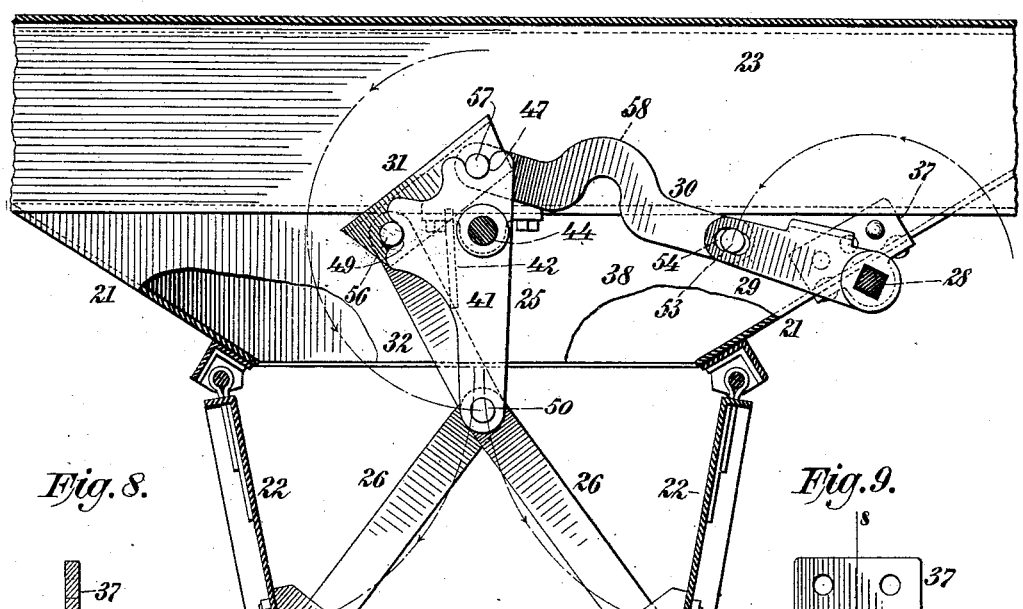
Figure 8:
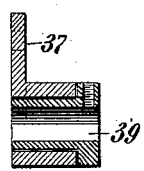
Figure 7:
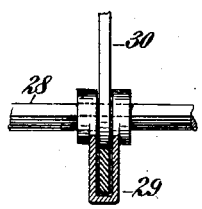
Figure 9:
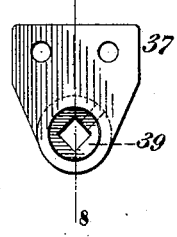

The invention will be fully understood from the detailed description hereinafter presented, reference being had to the accompanying drawings, in which:

Figure 1 is a vertical longitudinal section, on the dotted line 1—1 of Fig. 2, through a portion of a car of usual construction equipped with discharge gates and gate operating mechanism embodying my invention; Fig. 2 is a vertical transverse section of same on the dotted line 2—2 of Fig. 1; Fig. 3 is a detached vertical section, on the dotted line 3—3 of Fig. 4, of the pivotally mounted frame located between the center or draft sills; Fig. 4 is an edge view of the same; Fig. 5 is a view, corresponding with Fig. 1, illustrating a slightly modified construction embodying the invention; Fig. 6 is a corresponding view of the same, but illustrating the parts in the position they assume when the discharge gates are opened; Fig. 7 is a detached sectional view of a portion of the same on the dotted line 7—7 of Fig. 5; Fig. 8 is a vertical section on the dotted line 8—8 of Fig. 9, of one of the bracket bearings for the inner portion of the operating shaft; Fig. 9 is a face view of the same; Fig. 10 is a vertical section through the car on the dotted line 10—10 of Fig. 5, and denotes by the dotted line 5—5 the section on which Fig. 5 is taken; Fig. 11 is a vertical longitudinal section, corresponding with Figs. 1 and 5, through a car equipped with a further modified form of the invention; and Fig. 12 is a detached view illustrating convenient and familiar means for locking the operating shaft at the outer side of the car.

I illustrate in the accompanying drawings my invention applied to a familiar type of car adapted for carrying coal, coke and other substances, 20 designating the sides of the car, 21 downwardly converging or inclined floor sections leading to the discharge opening in the bottom of the car, 22 the hinged gates for said opening, 23 the center or draft sills of the car, 24 the usual covering for said sills, 25 a crank frame pivotally mounted between said sills and above said gates, 26 links pivotally secured at their upper ends to the upper end of said frame and at their lower ends to I-bolts 27 fastened to said gates, 28 a transverse operating shaft extending from one side of the car below one inclined floor section 21 to and across the space defined between the center-sills, 29 a crank-frame or arm secured upon the inner portion of said operating shaft, and 30, 31 and 32 respectively, pivotally connected links extending from said crank-frame 29 to the aforesaid pivotally mounted frame 25 and connecting the same together.

Upon the outer end of the operating shaft 28 is provided a ratchet locking wheel 33 to be engaged by a pawl 34, as shown in Fig. 12, said wheel and pawl being adapted for locking the operating shaft 28 at the outer side of the car and of familiar construction, as denoted by the patent of R. B. Kendig, No. 801,459, dated October 10, 1905. The wheel 33 is, as usual, formed with two projecting lugs 35, 36 to serve as bearing points for a crowbar or like device to be inserted between them and utilized, when it is desired to open the gates 22, for giving the wheel a very slight rotary movement toward the right, so that the pawl 34 may be raised from said wheel, and then giving said wheel a sufficient rotary movement toward the left, looking at Fig. 12, to effect through the aforesaid shaft and connected mechanism, the opening of said gates. The gates may be closed by means of a wrench or other suitable tool applied to the outer polygonal end of the shaft 28, as usual.

The operating shaft 28 is located to one side of the gates 22, where a person operating said shaft is not liable to become injured by the gates during their opening movement, nor by any material discharged from the car, and said shaft 28 extends transversely below the inclined floor section 21 where it is out of the way and does not interfere with the proper discharge of the material from the car. The outer end of the shaft 28 is mounted in a bearing secured to the outer side of the car and the inner portion of said shaft is mounted in bracket-bearings 37 secured to the plates 38, said bearings comprising tubular sleeves inclosing the rotary bushings 39 fitting said shaft 28 (Figs. 2, 8 and 9), which shaft is polygonal in cross-section, and, in the construction shown in Figs. 1 and 2, is formed with a crank portion 40 in vertical line with the space between the center or draft sills 23.

The crank frame 25 is shown in detail in Figs. 3 and 4 and is preferably in the form of an integral casting comprising two corresponding side members 41 connected, at one side of their vertical center, by an integral plate 42 and formed at their outer sides with hubs 43 and short trunnions or shafts 44 by which said frame becomes pivotally secured, said trunnions or shafts 44 being mounted within suitable bearings 45 bolted to the center sills 23. The crank frame 25 has, in use, imparted to it a pivotal or rocking motion from its initial position shown in Fig. 1 to its operated position shown in Fig. 6 and then back (on closing the gates) to its initial position, and the trunnion shafts 44 are on the lower portion of said frame, which lower portion is widened or formed with a downwardly projecting extension 46 having a notch 47 and a laterally projecting extension 48 having a notch 49, the purposes of which extensions and notches will appear hereinafter. The upper ends of the sides 41 of the frame 25 receive a pin 50 upon which, between said sides, the links 26 are hung and to which the upper operating link 32 is secured, the latter preferably being disposed on the middle of the pin 50 or between the upper ends of the gate-links 26, as shown in Fig. 2.

The links 26 are simply plain straight bars pivotally hung upon the pin 50 and at their lower ends pivotally secured by means of I-bolts 27 to the gates 22. In Fig. 1 the heads of the I-bolts 27 are not inclined toward each other and therefore when the links 26 are in their initial position, with the gates closed, said links do not lie parallel with each other but diverge slightly at their lower portions. In the construction shown in Figs. 5 and 11 the heads of the I-bolts 27 incline toward each other and permit the links 26, when the gates are in closed position, to lie parallel with each other. The crank frame 29 (Figs. 1 and 2) comprises two side members 51 formed with tubular hubs 93 which are slipped upon the operating shaft 28.
The operating links 30, 31, 32 are pivotally connected together in series, the upper end of the link 32 being secured on the pin 50, as above described, and the lower end of the lower link 30 being equipped with a laterally extending pin 53 which, at its ends, lies within elongated slots 54 provided in the outer ends of the members 51 of the crank frame 29, the slots 54 being provided for the constructions shown in Figs. 1 and 5 but not being necessary for the construction shown in Fig. 11. The middle link 31 is in the form of a three-sided frame comprising two opposite side members between which the facing ends of the links 30, 32 are pivoted and an upper connecting member 55 which, when the links 30, 31 and 32 are in their initial position, with the gates closed, engage the upper edges of said facing ends of the links 30, 32 and acts as a stop to prevent the connected set of links from sagging downwardly at their middle portion, the said connecting member 55 stiffening the series of links and compelling them to remain in line when the gates are closed and to turn upwardly during the opening of the gates. The middle link 31 is secured to the adjacent ends of the links 30, 32, by means of transverse pins 56, 57, which project laterally beyond the sides of said link 31 and are so disposed that during the opening of the gates 22 said pins will respectively enter the notches 49, 47 of the crank frame 25, as shown in Fig. 6.

When the features shown in Figs. 1, 2, 3 and 4 are in their initial position with the gates closed, the pin 50 at the upper end of the crank frame 25 is centrally above the pivotal point of said frame and said point is in line with the meeting edges of said gates, while the lower link 30 rests within the recessed or crank portion 40 of the operating shaft 28, whereby the center of the pin 53 carried by the lower end of said link becomes disposed below a center line through said operating shaft, a line drawn through and connecting the centers of the pins 50, 53 passing below the center of said shaft 28. The gates 22, therefore, become locked in their closed position at said shaft 28 by reason of the fact that the pin 53 is enabled to pass downwardly below a center line through said shaft, and under such condition any weight exerted upon the doors 22 will tend to increase the firmness with which said doors are locked, the pull created against the upper end of the crank frame 25 by any weight on the gates tending to pull the lower link 30 more firmly down into the crank portion 40 of said operating shaft. The gates 22 are also locked or held in their closed position against the pressure of the load upon them by reason of the fact that the pin 50 at the upper end of the crank frame 25 passes from the left toward the right above a vertical line through the pivot point of said frame. The frame 25 when in its initial position with the gates closed may stand vertically, as shown in Fig. 1, with the pin 50 directly above the pivot point of said frame or be inclined toward the right as shown in Figs. 5 and 11, under which construction the weight on the gates would tend to turn said frame 25 further to the right and hold the gates closed, the pin 50 in the constructions shown in Figs. 5 and 11 being at the right of a vertical line through the pivot point of said frame 25.

In the construction shown in Fig. 1 the pin 53 at the lower end of the lower link 30 is permitted to pass below a center line through the shaft 28 by reason of said shaft being formed with the recessed or crank portion 40, but a like result may be attained by the construction shown in Figs. 5 and 6, in which I form an upward bend or recess 58 in the link 30 to pass downwardly upon the operating shaft 28, which in this instance is straight, and allow the pin 53 to attain a position, when the gates are closed, below a center line through said shaft. The constructions presented in Figs. 1, 5 and 6 differ from each other only in the fact that in Figs. 5 and 6 the link 30 is formed with the upward bend 58, that the heads of the I-bolts 27 incline toward each other to permit the links 26 to lie parallel with each other and the frame 25 to be inclined toward the right, and that the crank frame 29 is an integral casting whose sides are connected at their lower edges by an integral member 52 serving as a rest for the lower link 30.

In the construction shown in Fig. 11, I omit the locking of the gates at the inner portion of the shaft 28, the pin at the lower end of the link 30 in Fig. 11 at no time passing below a center line through said shaft. The gates are, however, locked in their closed position, in the construction shown in Fig. 11, from the fact that the gate-links 26 may lie parallel with each other and that the pin 50 at the upper end of the crank frame 25 may pass to the right of a vertical line through the pivot point of said frame. The operating crank frame 25 of Fig. 11 is identical with the like frames in Figs. 1, 3, 4, 5 and 6.

In all of the constructions presented I will make use of some suitable means, such as illustrated in Fig. 12, for locking the operating shaft at the outer side of the car.

The operation of the mechanism hereinbefore described will be understood without special detailed explanation. In Figs. 1, 5 and 11 the gates are shown in their closed position, and when it is desired to open the gates, the attendant will, by turning the operating shaft 28, throw the crank frame 29 upwardly to elevate the links connected therewith and push the upper end of the operating crank frame 25 toward the left until said end passes beyond the vertical plane of the pivot point of said frame, at which time the weight of the gates and the force of the load on them will drive the gates to their full open position, said gates turning downwardly and outwardly and the frame 25 turning upside down, thereby permitting the gate-links 26 to assume the diverging position shown in Fig. 6 and the link-pins 56, 57 to respectively enter the notches 49, 47 of said crank frame 25, the pin 57 being supported directly above the pivot point of the then reversed frame 25 and the pin 56 being in the recess 49 which is then at the left hand side of said reversed frame. When it is desired to close the gates 22 the attendant will impart a reverse rotation to the operating shaft 28 and thereby actuate the crank frame 29 to, through the links 30, 31, 32, restore the operating crank frame 25 to its upright position, said frame 25 drawing upwardly on the links 26 and closing the gates. When the gates are in their open position the crank frame 25, through the pins 56, 57 and notches 49, 47, support the series of links 30, 31, 32, and when said gates are being closed said pins acting against the walls of said recesses, which are formed in lever extensions 46, 48 of said crank frame, operate to pull against said frame in a direction to aid in its restoration to its initial upright position. When the crank frame 25 reaches its initial position, the links 26 (or one of them in the arrangement shown in Fig. 5) will bring up against the transverse member or stop 42 of said frame and aid in arresting the latter.

What I claim as my invention and desire to secure by Letters-Patent, is:

1. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft lo-
cated to one side of said gates and having a crank-arm thereon, and a series of connected links pivotally secured to said crank-frame and crank-arm, said crank-frame having notches in its edges and one of the links of said series having pins to enter said notches during the opening of the gates; substantially as set forth.

2. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said crank-frame having a notch in its lower end and one of the links of said series having a pin to enter said notch when the gates are opened and said frame turns upside down; substantially as set forth.

3. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said crank-frame having a notch in its lower end and one of the links of said series having a pin to enter said notch when the gates are opened and said frame turns upside down, and said series of links being adapted on the closing of the gates to draw the upper end of said frame beyond the vertical plane of the pivot point of said frame; substantially as set forth.

4. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said links having means to prevent them from sagging or turning downwardly at their middle portion; substantially as set forth.

5. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said crank-frame comprising opposite side-members and a connecting member and receiving between them the gate-links, and said series of links having means to prevent them from sagging or turning downwardly at their middle portion; substantially as set forth.

6. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said series of links having means to prevent them from sagging downwardly at their middle portion, and said operating shaft having a recessed or crank portion to receive the lower one of said series of links and permit said crank-arm to carry the pivot point at the lower end of said link below a center line through said operating shaft and the pivot point at the upper end of said crank-frame; substantially as set forth.

7. A car having hinged discharge gates, inclined floor sections leading thereto, and center-sills, combined with a pivotally mounted crank-frame above said doors and between said sills, links pivotally secured at their upper ends to the upper end of said frame and at their lower ends respectively to said gates, a transverse operating shaft located to one side of said gates and having a crank-arm thereon, and a series of connected links pivotally secured to said crank-frame and crank-arm, said crank-arm and said series of links being adapted on the closing of the gates to draw the upper end of said crank-frame beyond the vertical plane of the axis of said frame, and said crank-arm being adapted to carry the pivot point at its outer end below a center line through said operating shaft and the pivot point at the upper end of said crank-frame; substantially as set forth.

Signed at Milton borough, in the county of Northumberland and State of Pennsylvania this ninth day of May A. D. 1907.

THOMAS R. BROWN.

Witnesses:
EDWIN PAUL,
ARTHUR L. HURSH.